United States Patent
Roberge et al.

(10) Patent No.: US 8,651,927 B1
(45) Date of Patent: Feb. 18, 2014

(54) COMBINE HARVESTER SIEVE ASSEMBLY WITH AN INTEGRATED AIR CLEANING SYSTEM

(75) Inventors: Martin J. Roberge, Saskatoon (CA); Jonathan Eugene Ricketts, Coal Valley, IL (US); Herbert M. Farley, Elizabethtown, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 13/614,045

(22) Filed: Sep. 13, 2012

(51) Int. Cl.
*A01F 12/32* (2006.01)
(52) U.S. Cl.
USPC .......................................................... 460/101
(58) Field of Classification Search
USPC ............... 460/101, 9, 69; 209/261, 22, 19, 28
See application file for complete search history.

(56) References Cited

U.S. PATENT DOCUMENTS

| | | | | |
|---|---|---|---|---|
| 2,240,779 A * | 5/1941 | Hunt et al. | | 209/318 |
| 2,250,383 A * | 7/1941 | Koester | | 209/22 |
| 2,692,679 A * | 10/1954 | Lindberg et al. | | 209/261 |
| 2,694,493 A * | 11/1954 | Odegarden | | 209/261 |
| 3,116,236 A * | 12/1963 | Helmut | | 209/26 |
| 3,334,739 A * | 8/1967 | Jarvis | | 209/19 |
| 3,374,886 A * | 3/1968 | Lightsey | | 209/28 |
| 4,017,206 A | 4/1977 | Döge et al. | | |
| 4,146,039 A | 3/1979 | Brillaud | | |
| 4,250,897 A * | 2/1981 | Glaser | | 460/69 |
| 5,176,574 A * | 1/1993 | Matousek et al. | | 460/100 |
| 5,403,235 A | 4/1995 | Baumgarten et al. | | |
| 5,624,315 A * | 4/1997 | Jonckheere | | 460/99 |
| 6,053,812 A * | 4/2000 | Loewen et al. | | 460/101 |
| 6,475,082 B2 * | 11/2002 | Visagie | | 460/45 |
| 6,500,062 B1 * | 12/2002 | Harris et al. | | 460/79 |
| 6,558,252 B2 * | 5/2003 | Visagie et al. | | 460/99 |
| 6,921,330 B2 * | 7/2005 | Grywacheski et al. | | 460/100 |
| 6,974,487 B2 | 12/2005 | Twiefel | | |
| 7,022,013 B1 | 4/2006 | Van Quekelberghe et al. | | |
| 7,028,844 B2 | 4/2006 | Nelson | | |
| 7,585,213 B2 | 9/2009 | Claerhout et al. | | |
| 7,670,218 B2 * | 3/2010 | Behnke et al. | | 460/4 |
| 7,846,013 B1 * | 12/2010 | Diekhans | | 460/1 |
| 7,896,731 B2 * | 3/2011 | Schwinn | | 460/101 |
| 7,998,245 B2 | 8/2011 | Demonie et al. | | |
| 2003/0140612 A1 * | 7/2003 | Gorden | | 56/100 |
| 2008/0234019 A1 | 9/2008 | Teroerde et al. | | |
| 2009/0095662 A1 * | 4/2009 | Redekop et al. | | 209/509 |
| 2009/0104952 A1 * | 4/2009 | Redekop et al. | | 460/80 |
| 2009/0124309 A1 * | 5/2009 | Redekop et al. | | 460/100 |
| 2010/0031616 A1 | 2/2010 | Gillingham et al. | | |
| 2010/0193411 A1 * | 8/2010 | Redekop et al. | | 209/509 |
| 2011/0269515 A1 | 11/2011 | Buehlmeier | | |

FOREIGN PATENT DOCUMENTS

| | | | | |
|---|---|---|---|---|
| EP | 0077416 A1 * | 4/1983 | | A01F 12/44 |
| JP | 07298772 A * | 11/1995 | | A01F 12/44 |

* cited by examiner

*Primary Examiner* — Árpád Fábián-Kovács
(74) *Attorney, Agent, or Firm* — Patrick M. Sheldrake (57) ABSTRACT

A combine harvester that employs a sieve assembly having a frame structure with movement that facilitates pressurizing an air supply connected thereto. Various aspects of the subject disclosure provide for sieve elements having internal air passages that are supported in the frame structure. A plurality of pressurized air ports are disposed along the frame structure or sieve elements and are oriented at an angle so as to direct pressurized air upwardly through the sieve elements. The pressurized air supply is in communication with the air ports.

18 Claims, 8 Drawing Sheets

COMBINE HARVESTER SIEVE ASSEMBLY WITH AN INTEGRATED AIR CLEANING SYSTEM

FIELD OF THE INVENTION

The present invention relates generally to agricultural combine harvesters, and more particularly to a sieve assembly in a combine cleaning unit.

BACKGROUND OF THE INVENTION

With conventional combine harvesters, the crops that are severed by the header are conveyed to a threshing and separating assembly where a rotor is rotated within a generally cylindrical chamber to thresh the crops. Grain, seed, or the like, is loosened and separated from the other crop material and falls onto a grain pan of a cleaning assembly, which typically includes a pre-cleaning sieve disposed above a second grain pan. The grain is then conveyed to a pair of stacked sieves disposed one above the other. The grain pans and sieves are generally oscillated in a back-and-forth motion for transporting and spreading the grain across the sieves, which separate or sift the grain from tailings and "material other than grain" (MOG). The cleaned grain passes by gravity through the apertures in the sieves to underlying clean grain collecting troughs where the grain is directed to a clean grain auger.

During vibration of the sieves, a cleaning fan is typically used to blow air upwardly and rearwardly through the sieves to carry lighter elements of the MOG, or chaff, away. The heavier elements and tailings that are too large to fall through the sieves and too heavy to be blown away are moved by the vibrations of the sieves generally rearwardly along the top surface of the sieves, and towards and over the edges of the sieves to fall onto a tailings pan, which is typically a plurality of tailings collecting troughs that convey the tailings to a tailings auger trough. This trough delivers the tailings to a return conveyor that carries the tailings back to the cleaning and separating system for reprocessing.

Often times, the air from the cleaning fan is inadequate to break up clusters of grain and MOG that accumulate and roll on the sieves. This material will eventually accumulate and overload the cleaning system, whereby the sieves lose their ability to separate the MOG from the grain. This situation often requires a shutdown and manual cleaning of the system.

An improved separating and cleaning system that decreases overloading of top and bottom sieves would be a welcome advancement in the industry.

BRIEF DESCRIPTION OF THE INVENTION

Aspects and advantages of the invention will be set forth in part in the following description, or may be obvious from the description, or may be learned through practice of the invention.

In accordance with aspects of the invention, a sieve assembly is provided for a combine harvester. The sieve assembly includes any manner of frame structure on which a plurality of sieve elements are supported. The sieve elements may be, for example, fixed or adjustable louvers, as is known in the art. A plurality of air ports are operably disposed along the frame structure and are oriented at an angle so as to direct pressurized air upwardly through the sieve elements. The air ports are in flow communication with a pressurized air supply and direct a continuous or pulsed air jet through the sieve elements to aid in agitating and separating the MOG from the grain.

In a conventional combine harvester utilizing an upper and lower sieve element, either or both of the sieve elements may be configured with the pressurized air ports, as set forth herein.

In a particular embodiment, the frame structure may include any number and configuration of generally hollow members that define internal air conduits in communication with the air ports. The frame structure is connected to a pressurized air supply such that pressurized air flows through the internal conduits and discharges from the air ports. In a certain embodiment, the internal conduits may be defined in any pattern of longitudinal and transverse components of the frame structure so as to define an internal air conduit grid. The internal conduits may be defined in only select members of the frame structure, such as the transverse members that extend generally perpendicular to the direction of grain flow along the sieve element.

The air ports may be variously configured. For example, the air ports may simply be holes in the frame structure (or other type of air conduits) that are defined at an angular orientation to direct pressurized air upwards and through the sieve elements. In an alternate embodiment, the air ports may be defined by adjustable or fixed nozzles that are attached to the frame structure.

In a different embodiment, a plurality of external air conduits may be attached to the frame structure, with the air ports defined as holes or nozzles in the external air conduits. For example, a tubular grid conduit may be separately formed and attached to the frame structure and pressurized air supply. This embodiment provides any desired number and location of air ports relative to the surface area of the sieve regardless of the existing frame structure.

In still another embodiment of a sieve assembly in accordance with aspects of the invention, the sieve elements have internal air passages that are in communication with the internal air conduits of the frame structure. Air ports are defined at suitable locations in at least a plurality of the sieve elements to direct the pressurized air from the individual sieve elements at an angle to effect cleaning of the sieve elements. In a particular configuration, the sieve elements may have a generally hollow interior that is in communication with the internal air conduits of the frame structure. Alternately, external air passage structure may be affixed to the sieve elements, for example along the edge of the sieve elements.

Pressurized air may be provided from various sources in the combine harvester. In one embodiment, the combine includes an onboard air compressor that may be a dedicated source for the sieve assembly, or may serve any number of other engine or systems functions. This compressor may charge an accumulator (e.g., air tank), wherein discharge from the accumulator is controlled by a controller so as to direct pulsed or continuous air jets from the air ports. For example, the controller may cycle a solenoid valve that is operably disposed between the accumulator and air ports for this purpose.

In a particular embodiment, the frame structure is driven in a traversing motion by any suitable reciprocating drive. This motion causes the grain/MOG to be conveyed along the sieve. The reciprocating drive may also be connected to a compressor mechanism, such as an air piston, to generate the pressurized air. The piston may be actively driven by the reciprocating drive in a power stroke that also drives the frame structure, which may require a larger or more powerful drive mechanism. With conventional drive systems, the frame structure typically returns to a home position under its own weight and inertia after the power stroke, which in turn causes the crank arm of the drive to return to a corresponding home position. In a unique embodiment, this passive return stroke of the drive mechanism is used as an energy source to power a compressor mechanism. For example, a crank attached to the reciprocating drive may be connected to an air piston that generates pressurized air on the return stroke of the drive. This piston may be connected directly in line with the conduits and air ports such pulsating air jets are produced from the air ports at a frequency corresponding to a drive frequency of the reciprocating drive. Alternately, the piston may charge an accumulator, as discussed above.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
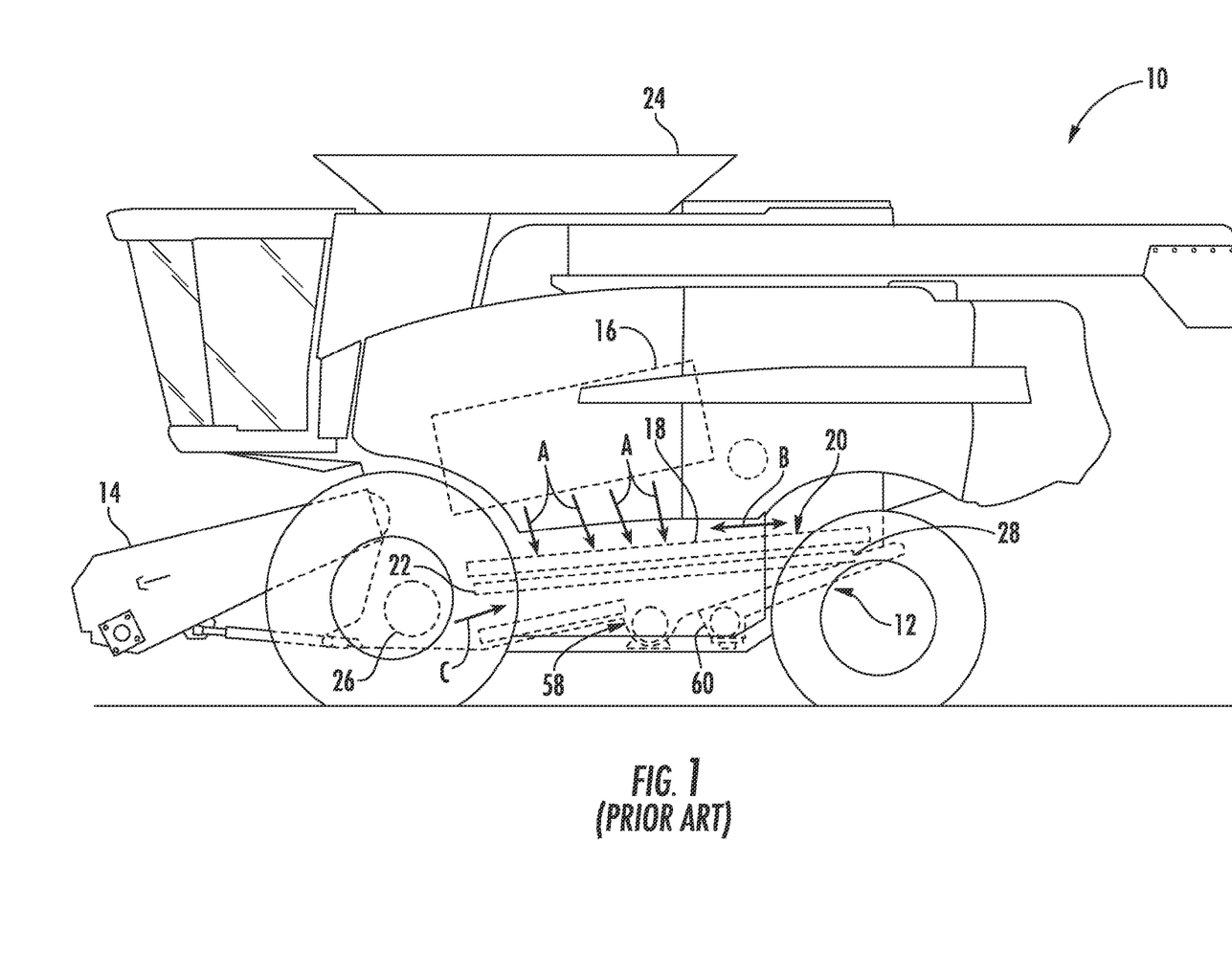
FIG. 1 is a side view of a conventional combine harvester.

Referring now to the drawings, wherein like numbers refer to generally like items or features, FIG. 1 depicts a conventional combine harvester 10 having a feeder house 14 on a front end thereof, to which is connectable a header (not shown), operable to sever a swath of crops from a field as the combine 10 moves forward and to convey the severed crops to feeder house 14. Feeder house 14 includes an internal conveying system (not shown), for conveying the crops upwardly and rearwardly into the body 12 of the combine 10 and into an inlet of a separating or threshing system 16. Threshing system 16 generally includes a rotor at least partially enclosed in a concave defining an arcuate space therebetween, and in which space the crop material is processed for separating grain and material other than grain (MOG) from straw, with the straw being ejected rearwardly from the threshing system 16 through the rear end of the combine 10 for deposit on the field, as is well-known.

As threshing system 16 operates, crop material will fall and/or be conveyed therefrom, as denoted generally by arrows "A" in FIG. 1, onto an upper sieve 18 of a cleaning system 20 located below threshing system 16 within the body of combine 10. Such cleaning system 20 also includes a lower sieve 22 positioned below upper sieve 18 in a stacked relationship therewith. The sieves 18 and 22 are configured to be reciprocally moved or vibrated relative to one another to effect a sifting of material falling onto the upper sieve 18, as indicated by arrow "B" in FIG. 1.

As the crop material from the threshing system 16 falls onto upper sieve 18, air from a fan 26 is blown upwardly and rearwardly through sieves 18 and 22, as indicted by arrow "C" in FIG. 1. In conventional combines, this combination of air flow and the vibratory movement of the sieves 18 and 22 is meant to cause the lighter elements of the MOG (also referred to as chaff) to be blown upwardly and rearwardly away from sieves 18 and 22. Such chaff is typically blown into an optional chaff spreader (not shown), operable for distributing the chaff over a desired swath of the field from which the crop is cut, or directed into an optional chopper (also not shown), operable for mixing the chaff with straw for chopping and distributing such mix, or simply directed downwardly onto the field through a rear opening of the combine, all of which operations are well-known in the art.

The upper sieve 18 includes openings therethrough that are sized to allow separated grain as well as some smaller elements of MOG, sometimes referred to as tailings, to pass therethrough and to fall onto lower sieve 22 of the cleaning system 20, thus sifting the separated grain and tailings from larger elements of MOG. The larger elements of MOG that are unable to pass through upper sieve 18 are moved to the rear peripheral edge portion of the sieve by the vibratory movements of such sieve and fall either directly onto the underlying field or onto or into other apparatus for further processing, including chopping and/or spreading. Such further processing of the larger elements of MOG may be accomplished in various well-known manners.

The lower sieve 22 has smaller openings than upper sieve 18, such that the sieves 18 and 22 will act as a progressive sifting or cleaning mechanism for separating and cleaning grain from the tailings that were also able to pass through sieve 18. To facilitate such sifting action and the flow of grain through the stacked sieves 18 and 22, the sieves are vibrated or reciprocally moved, typically in a fore and aft direction, as denoted by arrow B. The grain that falls through lower sieve 22 into clean grain and tailings systems 12 of the combine 10 is considered to be clean grain that is desired to be collected and ultimately conveyed to a grain tank 24. The tailings that are allowed to pass through the upper sieve 18 often still contain some un-separated grain, and retention of such tailings for further processing to effect separation of the grain is generally desired. The tailings that are unable to pass through the smaller openings on lower sieve 22 are caused to move towards a rear peripheral edge portion 28 of sieve 22, and to fall by the vibratory movement of lower sieve 22 into clean grain and tailings system 12 for further processing.

Figure 2:
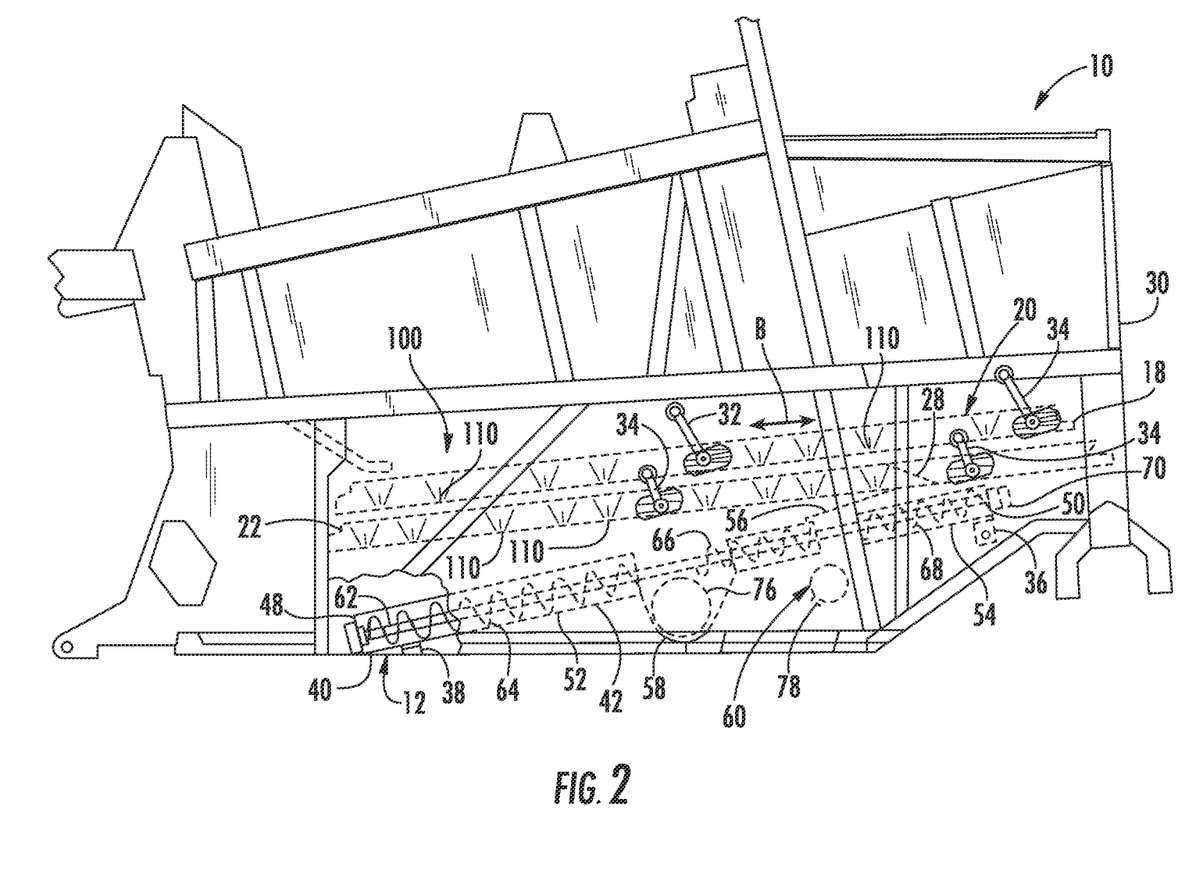
FIG. 2 is a side and partial cut-away view of a combine grain cleaning assembly incorporating aspects of the present invention.

Referring to FIG. 2, certain elements of the cleaning system 20 are depicted in greater detail, as well as further details of the clean grain and tailings conveying system 12. In this regard, FIG. 2 illustrates the manner in which sieves 18 and 22 may be suspended from a structural frame 30 of combine 10 by pivoting support arms 32 and 34, respectively, for reciprocal fore and aft movement denoted by arrow B. Such movement may be readily effected by various suitable and well known reciprocating drive mechanisms (not shown) that operate in well-known manners. Clean grain and tailings conveying system 12 is depicted as being fixedly connected or mounted below lower sieve 22 of cleaning system 20 to structural frame 30 by brackets 36 and 38, so as to be immovable relative to structural frame 30.

As indicated in FIG. 2 and explained in greater detail below, in accordance with aspects of the present invention, the sieves 18 and 22 may be configured with an assembly 100 for directing pressurized jets air via ports 110 in a pulsating or continuous manner through the sieve elements 18, 22 to enhance the separating action.

The clean grain and tailings conveying system 12 of FIGS. 1 and 2, generally includes a pan 40 that is fixedly mounted to structural frame 30 by brackets 36 and 38 so as to be located directly beneath lower sieve 22. This pan 40 may include an array of elongated, longitudinally extending collecting troughs 42 positioned side-by-side across the width of pan 40. Such collecting troughs 42 generally extend in the fore and aft direction, between a forward edge 48 and a rear edge 50 of trough 42. Each collecting trough 42 has a clean grain receiving portion 52 located beneath those regions of lower sieve 22 through which clean grain is expected to fall, and a tailings receiving portion 54 positioned beneath peripheral edge portion 28 of lower sieve 22. A deflector shield 56 is preferably disposed beneath the rear end portion of lower sieve 22 to deflect clean grain onto clean grain receiving portion 52 of pan 40, as opposed to tailings receiving portion 54 located below the rear end.

A clean grain auger trough 58 is disposed generally crosswise to and in communication with the clean grain collecting troughs 42 of clean grain receiving portion 52 such that clean grain can be conveyed through the clean grain collecting troughs to the clean grain auger trough. A tailings auger trough 60 is disposed generally cross-wise to and in communication with the tailings collector troughs 42 of tailings receiving portion 54.

An elongated, helical auger 62 is supported in each collecting trough 42, with each auger 62 including a first helical auger flight 64 extending in a first predetermined rotational direction and a second helical auger flight 66 and third auger flight 68 extending in a second rotational direction opposite the first rotational direction. Each auger 62 is connected to a drive mechanism, which may include a bevel gear 70 on the rear end of auger 62 that meshes with a drive gear (not shown) rotated by any suitable drive, such as a belt, chain or shaft, in connection with a power plant of combine 10 (not shown).

When augers 62 are rotated in a predetermined rotational direction, flights 64, 66, and 68 will convey clean grain and tailings separately and simultaneously along collecting troughs 42, with clean grain from the clean grain collecting troughs being moved into clean grain auger trough 58 and tailings from the tailings collector troughs being moved into tailings auger trough 60. Clean grain auger trough 58 preferably has a helical auger 76 associated therewith and tailings auger trough 60 preferably has a similar auger 78 associated therewith, which augers are rotatable in the conventional manner using suitable drives (not shown) for conveying the clean grain and tailings, respectively, to a clean grain elevator (not shown) and a tailings return system (also not shown), in well-known manners.

Referring again to FIG. 2, a sieve assembly 100 incorporating aspects of the present invention is depicted. Either or both of the upper sieve 18 and lower sieve 22 are configured with a plurality of air ports 110 disposed along the respective frame structure 102 (FIG. 3) of the sieve elements. The air ports 110 are distributed in a pattern and are oriented at an angle so as to direct pressurized air upwardly through the sieve elements, as graphically depicted in FIG. 2. The air ports 110 are in communication with a source of pressurized air, as discussed in greater detail below. The air ports 110 are preferably provided in a number and arranged in a pattern so as to provide generally uniform coverage over the surface area of the respective sieves 18, 22. The pressurized air discharged from the ports 110 may be continuous in one embodiment, or may be pulsed in another embodiment. The air may be in addition to the air provided by the fan 26 (FIG. 1) or, in certain embodiments, the assembly 100 may replace the fan 26.

The air jets from the ports 110 serve to break up the clusters of grain and MOG that may accumulate and roll on the sieve, as discussed above.

Figure 3:
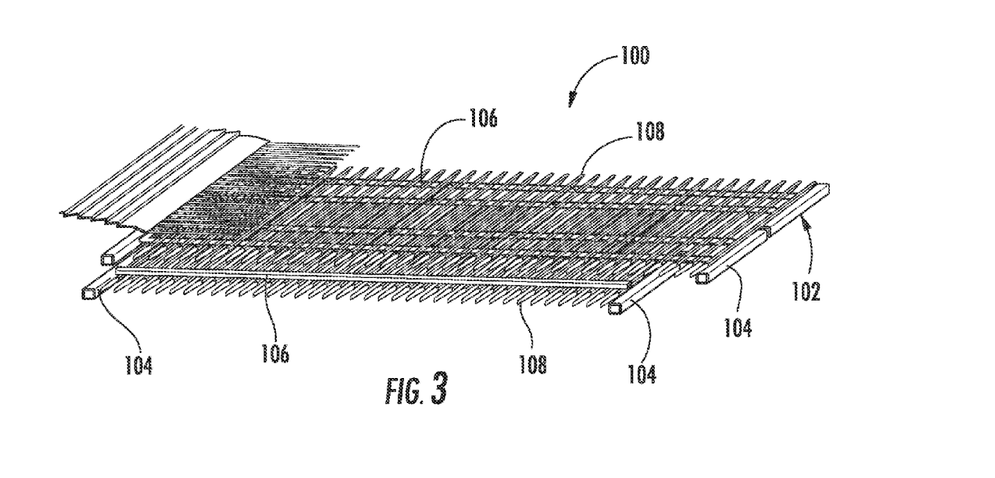
FIG. 3 is a perspective view of a sieve assembly incorporating an embodiment of an air cleaning system.
Figure 4:
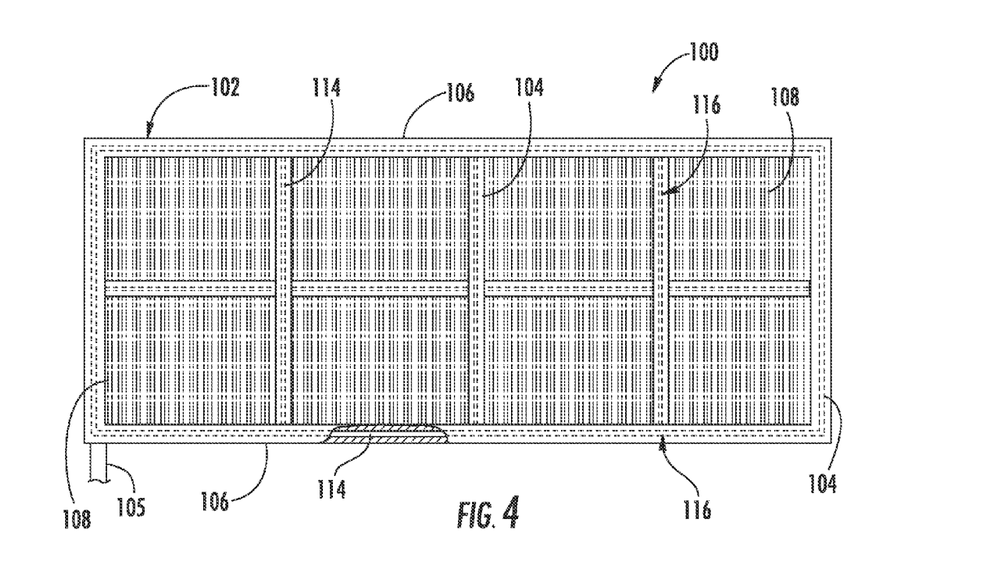
FIG. 4 is a bottom and partial cut-away view of a sieve assembly incorporating an embodiment of an air cleaning system.

Referring to FIGS. 3 and 4, embodiments of a sieve assembly 100 are depicted. The sieve assembly 100 includes a frame structure 102 typically comprised of longitudinal members 106 and transverse members 104 that define a grid-type configuration. Sieve elements 108 are supported by the frame structure 102. The invention is not limited by any particular type of sieve element 108 or frame structure 102. Typical sieve elements 102 may be louver elements, as is generally well-known in the art and need not be described in detail herein.

Still referring to FIGS. 3 and 4, the frame structure 112 may be defined by internal air conduits 114 within the frame structure elements 104, 106. For example, the structural elements 104, 106 may be generally hollow tubular elements that are in communication with a pressurized air source via a connection 105. FIG. 4 is a bottom view of this particular embodiment and illustrates that the frame member elements 104, 106 define an internal conduit grid 116 below the sieve elements 108. Air ports (not visible in FIG. 4) are in communication with the internal air conduits 114 for directing the pressurized air from the internal air conduit grid 116 at the desired angular orientation relative to the sieve elements 108.

Figure 5:
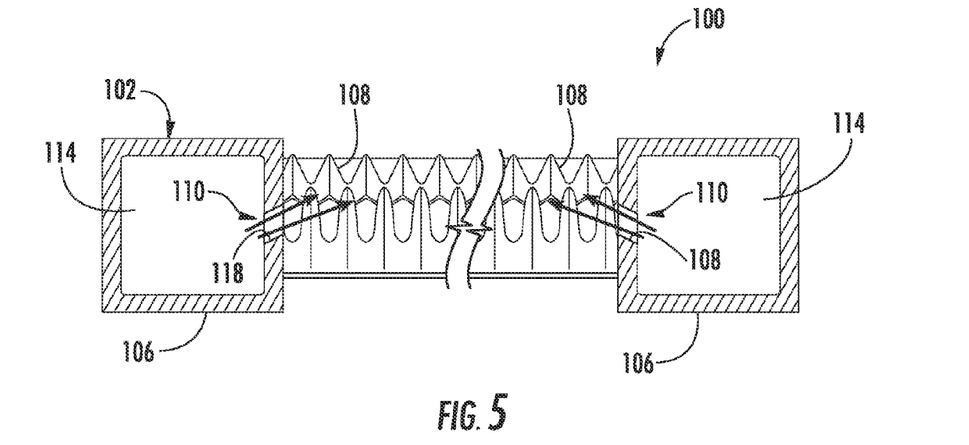
FIG. 5 is an end cross-sectional view of an embodiment of a sieve assembly incorporating an air cleaning system.

For example, referring to FIG. 5, an end cross-sectional view of a particular embodiment of a sieve assembly 100 is depicted wherein the air ports 110 that direct the pressurized air from the internal air conduits 114 are defined simply as holes 118 in the structural frame members 106. The holes 118 are defined at a desired angular orientation so as to direct the pressurized air upwards and through the respective sieve elements 108, as generally depicted by the flow arrows in FIG. 5.

Figure 6:
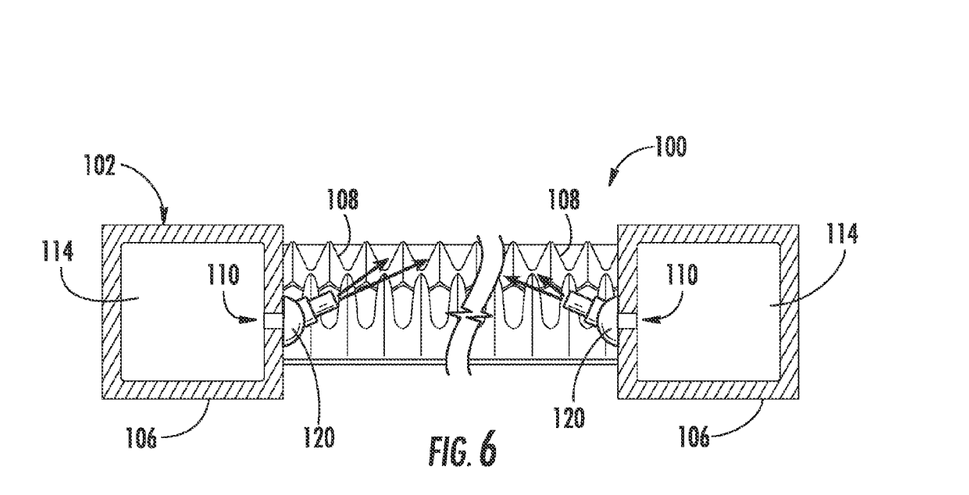
FIG. 6 is an end cross-sectional view of an alternate embodiment of a sieve assembly incorporating an air cleaning system.

In the embodiment of FIG. 6, the air ports 110 are defined by nozzles 120 that are mounted onto the structural frame members 106. These nozzles 120 may be fixed in position or adjustable and serve to direct the pressurized air upwards through the sieve elements 108.

Figure 7:
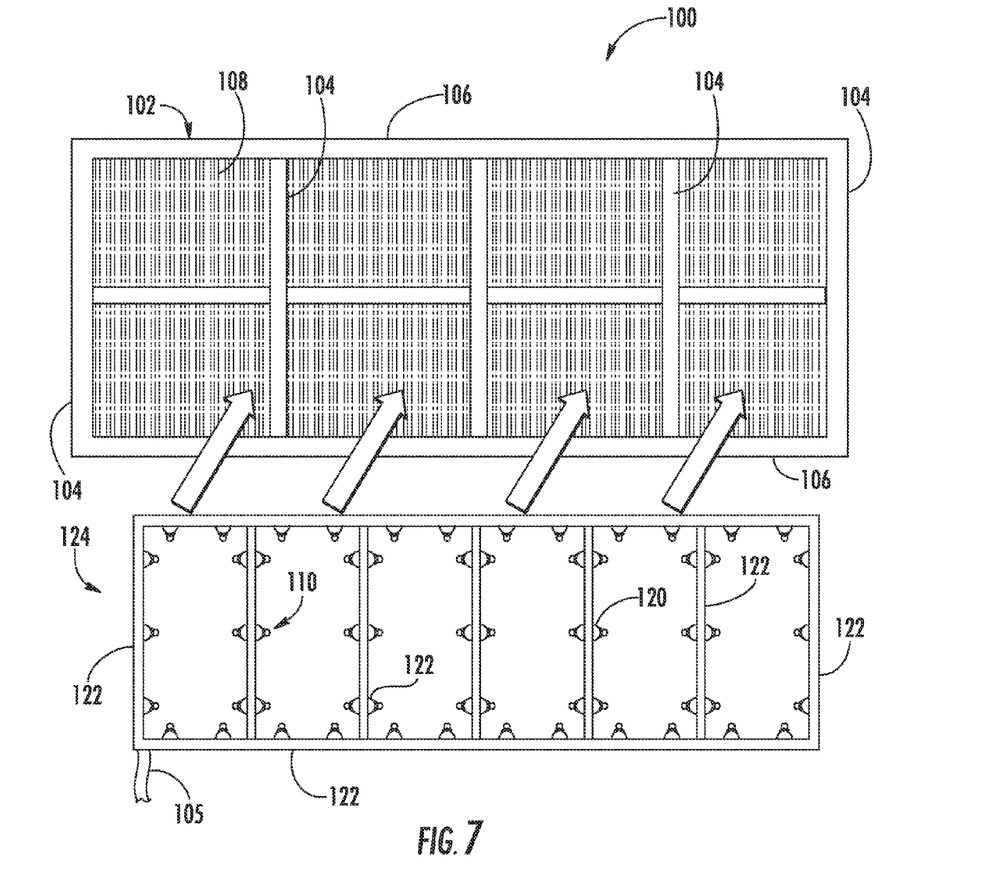
FIG. 7 is a component view of an embodiment of a sieve assembly incorporating an air cleaning system.

FIG. 7 depicts an embodiment wherein a grid configuration 124 of external conduit members 122 is provided for attachment to the structural members 104, 106 of the frame structure 102 by any suitable means. The external conduits 122 may be, for example, tubular members that are also defined into a grid 124 that may essentially compliment or match the grid configuration of the frame structure 102 so as to be securely mounted to the underside of the frame structure elements 104, 106. In an alternate embodiment, the external conduits 122 may be spaced between the structural members 106, 104 of the frame structure 102. The external conduits are provided with a plurality of air ports 110 in a number and pattern so as to define a desired degree of coverage below the surface area of the sieve elements 108. It should be appreciated that the invention is not limited to any particular number of air ports 110 or pattern. In the embodiment depicted in FIG. 7, the air ports 110 are nozzles 120, which may be fixed or adjustable. The air ports 110 may, in an alternate embodiment, be defined simply as holes 118 (FIG. 5) defined in the external conduits 122.

The sieve assembly 100 may be provided with a source of pressurized air via any suitable existing system on the combine 10 (FIG. 1). For example, referring to FIG. 8, the combine 10 may include an air compressor 126 that serves various engine and/or other operational functions. This compressor 126 may be used to charge an accumulator or tank 128 that supplies pressurized air to the frame structure 102 (or external conduit grid 124). Discharge from the air tank 128 may be controlled by a controllable valve 130, such as a solenoid valve, that is cycled by a system controller 132 to provide either continuous or pulsed air through the sieve assembly 100, as discussed above.

It should be appreciated that, in an alternate embodiment, a dedicated air compressor or other pressurized air source may be provided within the combine 10 for supplying the sieve assembly 100.

Figure 9:
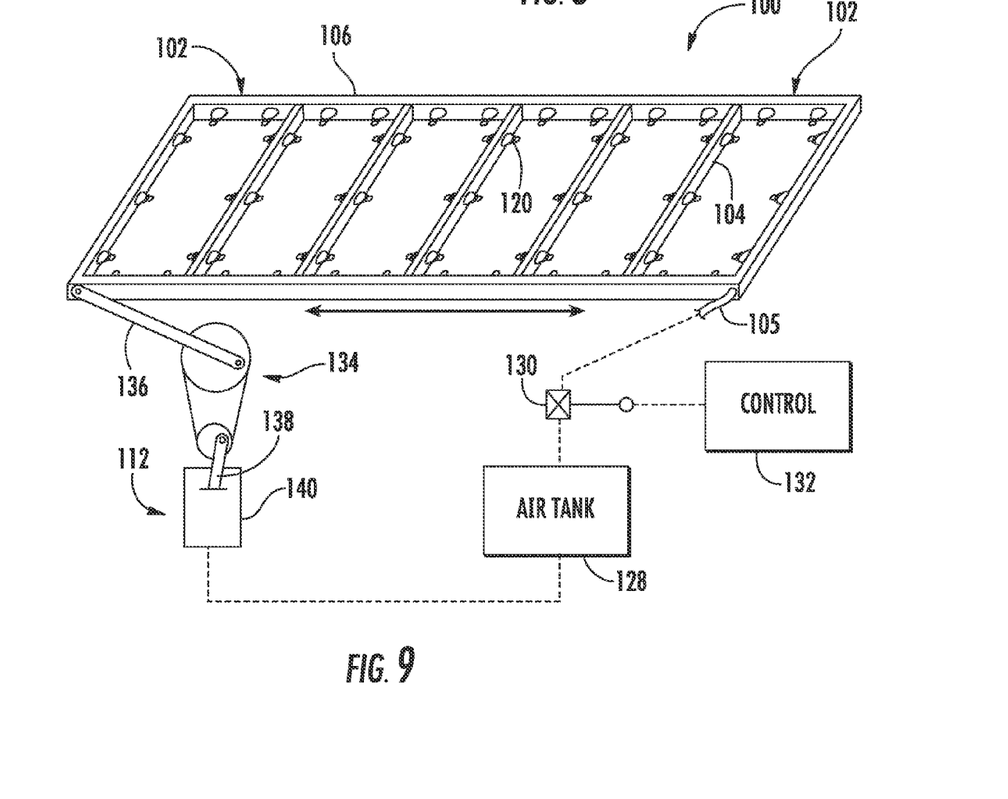
FIG. 9 is a component view of still another embodiment of a sieve assembly incorporating an air cleaning system.

FIG. 9 depicts an embodiment of a sieve assembly 100 in accordance with aspects of the invention wherein the pressurized air source 112 is functionally provided by the reciprocating drive 134 used to drive the sieve frame structure 102 in its vibratory to-and-fro motion, as discussed above. Any type of suitable reciprocating drive 134 may be utilized, as is well known by those skilled in the art. In a typical configuration, the reciprocating drive 134 utilizes a cam to drive a crank arm 136 connected to the frame structure 102. With these type of systems, the frame structure 102 typically returns to a home position under its own weight and inertia after the power stroke of the crank arm 136, which in turn causes the crank arm 136 or cam to return to a corresponding home position. In certain known systems, this return stroke must be buffered or dampened. In the embodiment depicted in FIG. 9, the energy of the return stroke of the drive mechanism 134 is harnessed to drive a compressor mechanism 140, such as an air piston. As schematically indicated in FIG. 9, the drive mechanism 134 is mechanically connected to the compressor mechanism 140 through any manner of suitable linkage in order to drive the mechanism 140. For example, in the embodiment depicted in FIG. 9, a second crank arm 138 may be operably connected to the drive mechanism 134 so that on the return stroke of the drive mechanism, the crank arm drives piston within an air piston embodiment of the compressor mechanism 140. The output of this mechanism 140 may be used to charge an accumulator or tank 128, which then supplies the pressurized air via a control valve 130 to the frame structure 102 under the control of a controller 132.

It should further be appreciated that an embodiment similar to that depicted in FIG. 9 may be provided within the drive mechanism 134 also charges the air tank 128 via a compressor mechanism 140 on the positive drive stroke of the drive mechanism 134, instead of on the passive return stroke as discussed above.

Figure 10:
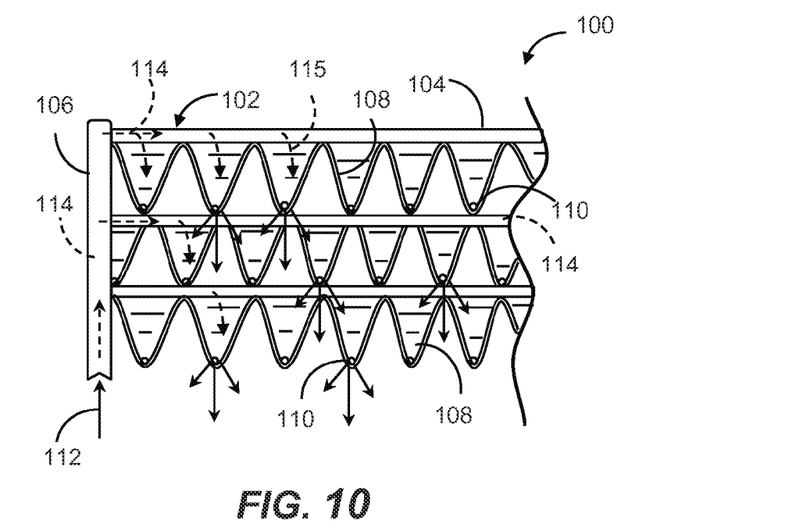
FIG. 10 is a partial top view of an alternate embodiment of a sieve assembly incorporating an embodiment of an air cleaning system.

FIG. 10 depicts an embodiment of a sieve assembly 100 wherein the air ports 110 are defined on the individual sieve elements 108 instead of or in combination with ports defined on the frame structure 102. For example, the frame structure 102 may define internal air conduits 114 in the transverse members 104 and longitudinal members 106 that are supplied with pressurized air via any suitable air supply 112 (including those discussed above). The individual sieve elements 108 include internal air passages 115 that are in flow communication with the internal air conduits 114 such that pressurized air is conducted from the frame members 102 to the sieve elements 108. For example, the sieve elements 108 may be defined by shell members that define a generally hollow interior volume that is in flow communication with the internal conduits 114 such that pressurized air is introduced directly into the individual louvers of the sieve elements 108. In an alternate embodiment, any manner of external or internal conduit members, such as tubing or piping, may be configured within or external to the sieve elements, with such conduit members being in flow communication with the internal conduits 114 of the frame members 102.

Still referring to FIG. 10, it should be appreciated that any pattern of ports 110 may be defined along any one or combination of the sieve elements 108. It is not necessary that every louver of the sieve elements have a port 110. The ports 110 are supplied in a number and pattern to provide an effective cleaning of the sieve elements 108.

Figure 8:
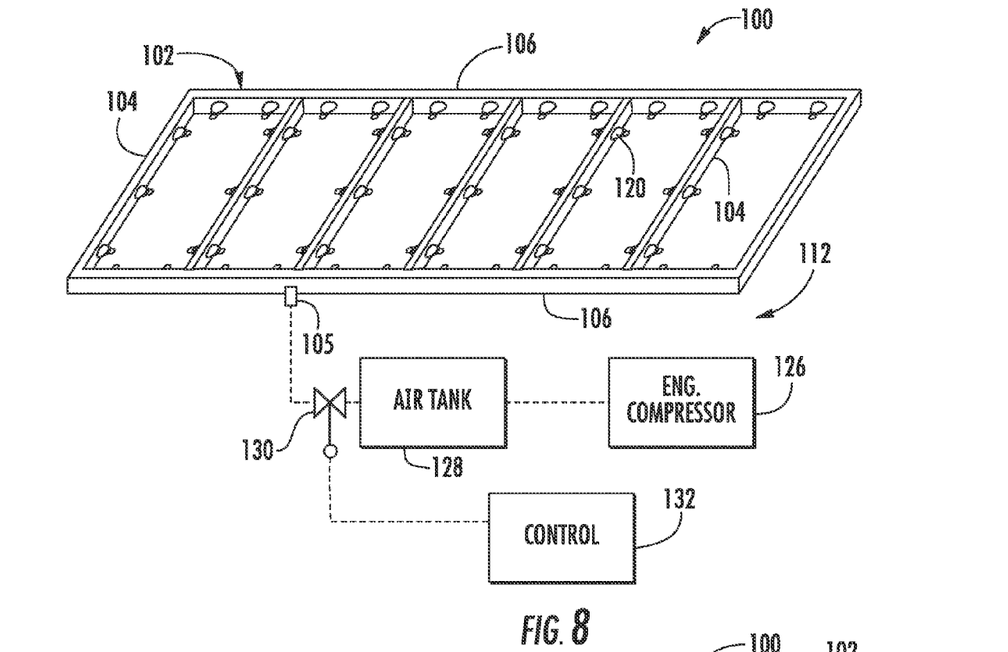
FIG. 8 is a component view of an alternate embodiment of a sieve assembly incorporating an air cleaning system.
Figure 11:
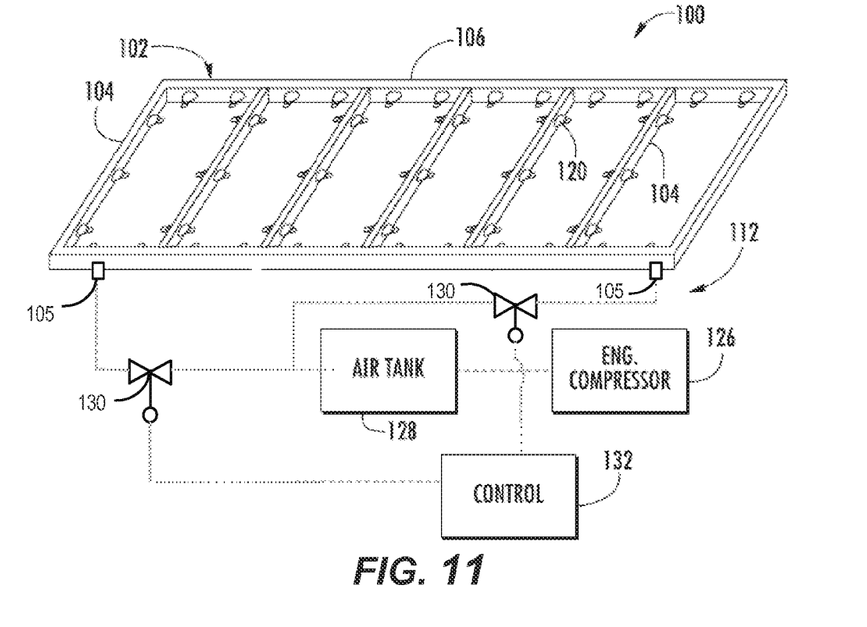
FIG. 11 is a component view of another embodiment of a sieve assembly incorporating an air cleaning system.

FIG. 11 depicts an embodiment of a sieve assembly 100 similar to the embodiment of FIG. 8 discussed above wherein an air compressor 126 that serves various engine and/or other operational functions is used to charge an accumulator or tank 128 that supplies pressurized air to the frame structure 102 (or external conduit grid 124) via connections 105. Discharge from the air tank 128 may be controlled by multiple controllable valves 130, such as solenoid valves, that are cycled by a system controller 132 to provide either continuous or pulsed air through the sieve assembly 100. The use of multiple valves 130 allows for different control parameters for different parts or sections of the sieve assembly 100. For example a front blast pattern may be generated that is different from a rear blast pattern, and so forth. It should be appreciated that various configurations of valves 130 and different control patterns are within the scope and spirit of the invention.

Figure 12A:
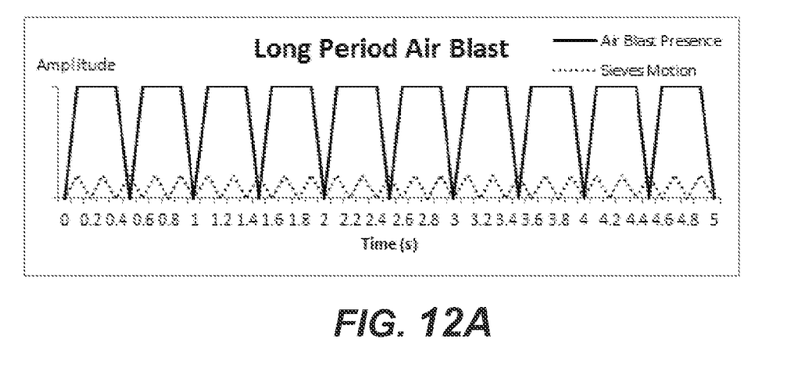
FIGS. 12A through 12C are graphs of exemplary air blast profiles for a sieve air cleaning system.
Figure 12B:
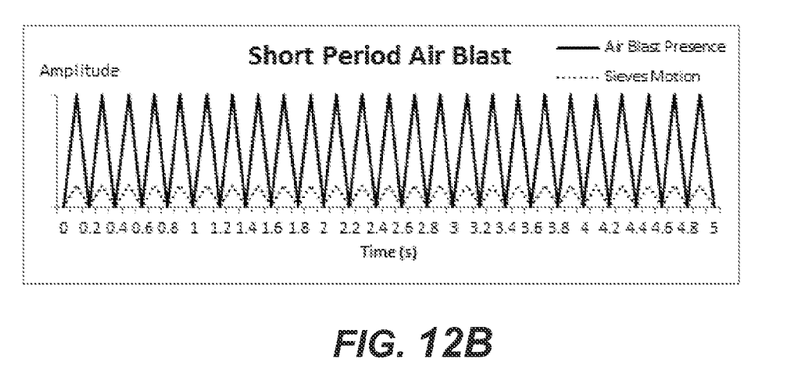
Figure 12C:
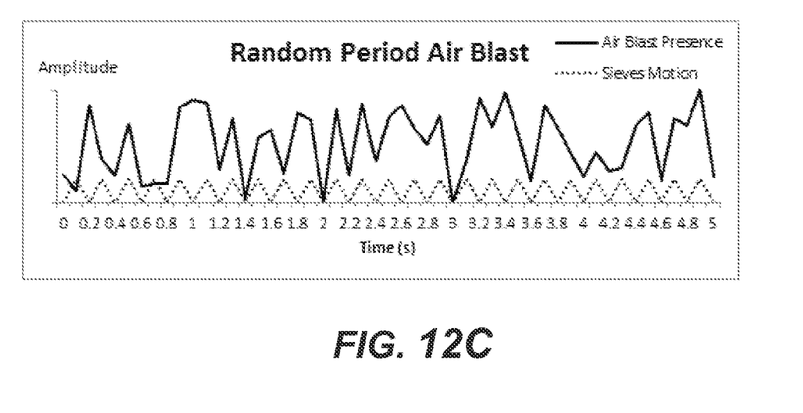

FIGS. 12A through 12C depict various air blast frequency and period patterns that may be utilized in any one of the sieve assemblies 100 in accordance with aspects of the invention. The nozzles may blow air jets at any designed frequency or period (e.g., by appropriate control of valves 130) depending on any number of factors, such as type of crop being harvested, and the like. FIG. 12A depicts a relatively long air blast period relative to sieve motion as compared, for example, to FIG. 12B. FIG. 12C depicts a random air blast period relative to sieve motion.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A sieve assembly for a combine harvester, comprising:
   a frame structure with movement driven by a reciprocating drive;
   sieve elements supported in said frame structure; the sieve elements with air passages that are internal thereto;
   a plurality of pressurized air ports disposed along said frame structure and as part of the sieve elements oriented at an angle so as to direct pressurized air upwardly through said sieve elements into a space that has no substantial increase in pressure over a surrounding thereof; and
   a pressurized air supply that is pressured by the reciprocating drive, wherein the pressurized air supply is in communication with said air ports.

2. The sieve assembly as in claim 1, wherein said frame structure defines internal air conduits in communication with said air ports, said internal air conduits in communication with said pressurized air supply.

3. The sieve assembly as in claim 2, wherein said internal air conduits are defined in longitudinal and transverse components of said frame structure so as to define an internal air conduit grid.

4. The sieve assembly as in claim 2, wherein said air ports comprise holes defined in said frame structure at an angular orientation to direct pressurized air through said sieve elements.

5. The sieve assembly as in claim 2, wherein said air ports comprise nozzles connected to said frame structure, said nozzles in communication with said internal air conduits.

6. The sieve assembly as in claim 1, comprising a plurality of external air conduits attached to said frame structure, said air ports defined in said external air conduits.

7. The sieve assembly as in claim 6, wherein said external air conduits are attached to components of said frame structure so as to define an external air conduit grid supported on said frame structure.

8. The sieve assembly as in claim 6, wherein said air ports comprise nozzles connected to said external air conduits.

9. The sieve assembly as in claim 6, wherein said air ports comprise holes defined in said external air conduits at an angular orientation to direct pressurized air through said sieve elements.

10. The sieve assembly as in claim 1, wherein said pressurized air supply comprises a connection to an air compressor source of the combine harvester.

11. The sieve assembly as in claim 1, wherein said pressurized air supply comprises an accumulator that discharges air to said air ports in a continuous or pulsed manner in response to a control signal from a controller.

12. The sieve assembly as in claim 1, further comprising a reciprocating drive connected to said frame structure, said pressurized air supply comprising a compressor mechanism driven by said reciprocating drive.

13. The sieve assembly as in claim 12, wherein said compressor mechanism is passively driven by return strokes of said reciprocating drive.

14. The sieve assembly as in claim 12, wherein said compressor mechanism is actively driven by power strokes of said reciprocating drive.

15. The sieve assembly as in claim 12, wherein said compressor mechanism comprises an air piston in direct communication with said air ports such that pulsating air jets are produced from said air ports at a frequency corresponding to a drive frequency of said reciprocating drive.

16. The sieve assembly as in claim 12, wherein said compressor mechanism is in communication with an accumulator, wherein discharge of pressurized air from said accumulator is controlled by a controller so as to produced pulsed or continuous air jets from said air ports.

17. A sieve assembly for a combine harvester, comprising:
    a frame structure, said frame structure defining internal air conduits, the frame structure with a return stroke that compresses air into a pressurized air supply;
    sieve elements supported in said frame structure, said sieve elements having internal air passages in communication with said internal air conduits of said frame structure;
    a plurality of pressurized air ports disposed along at least a plurality of said sieve elements and internal thereto, the oriented at an angle so as to direct pressurized air from internal air passages into a space that has no substantial increase in pressure over a surrounding thereof, to effect a cleaning of said sieve elements; and
    the pressurized air supply being pressurized by the return stroke, wherein the pressurized air supply is in communication with said air ports via said frame structure and said sieve elements.

18. The sieve assembly as in claim 17, wherein said sieve elements have a generally hollow interior in communication with said internal air conduits of said frame structure.

* * * * *